July 14, 1953   F. F. GUNTHER   2,645,376
CONTAINER SUPPORT
Filed July 30, 1947   3 Sheets-Sheet 1
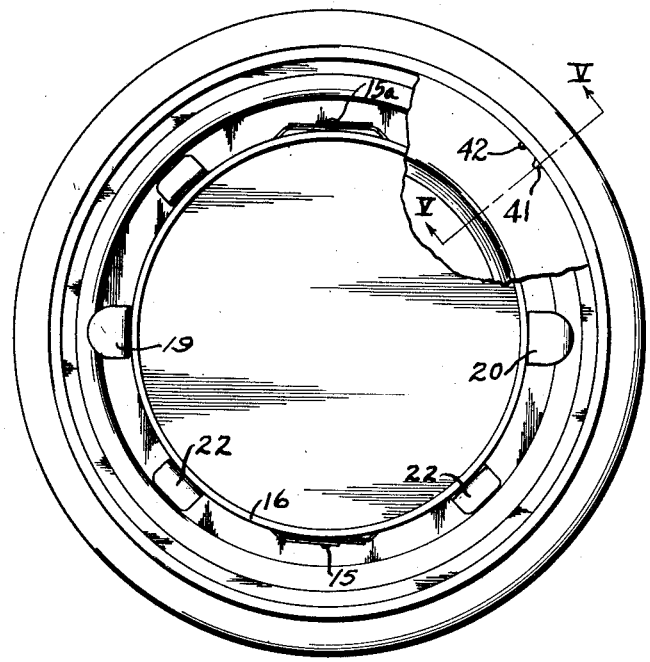
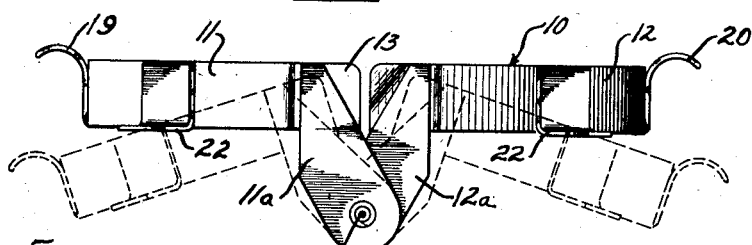
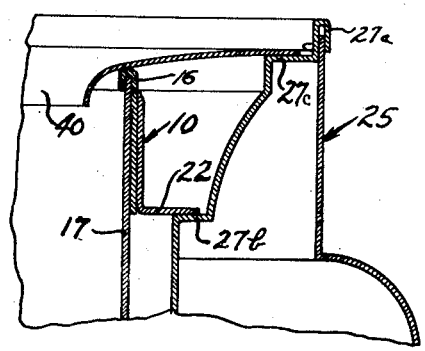
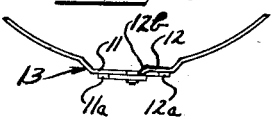
Inventor
FREDERICK F. GUNTHER July 14, 1953   F. F. GUNTHER   2,645,376
CONTAINER SUPPORT
Filed July 30, 1947   3 Sheets-Sheet 2
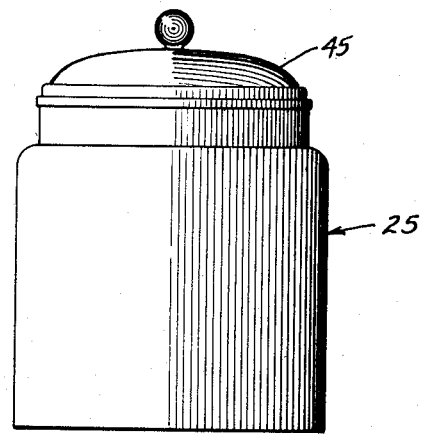
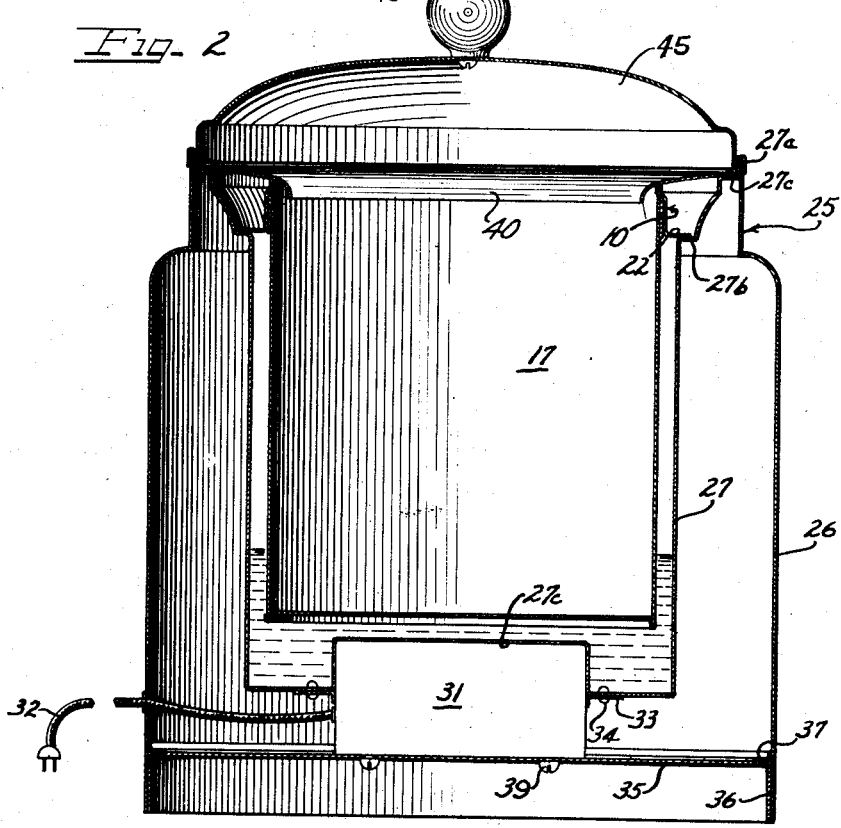
Inventor
FREDERICK F. GUNTHER
by
Attys.

July 14, 1953 F. F. GUNTHER 2,645,376
CONTAINER SUPPORT
Filed July 30, 1947 3 Sheets-Sheet 3
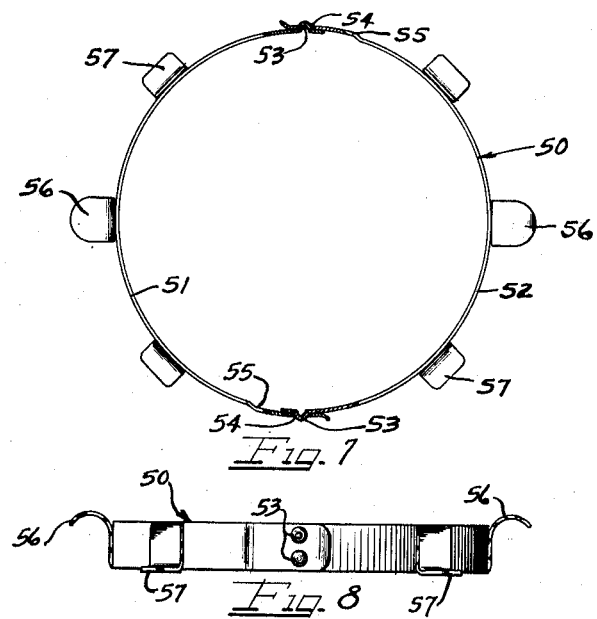
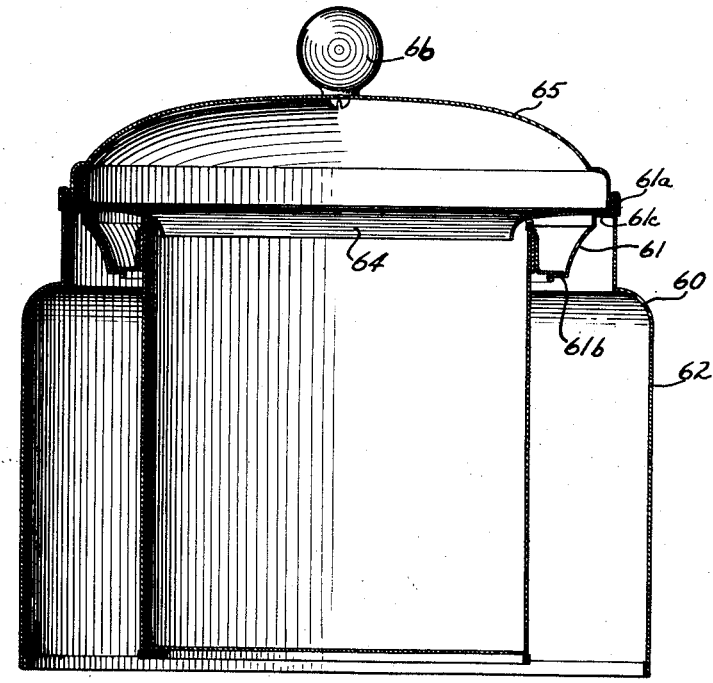
Inventor
FREDERICK F. GUNTHER Patented July 14, 1953

2,645,376

UNITED STATES PATENT OFFICE 2,645,376

CONTAINER SUPPORT

Frederick F. Gunther, Chicago, Ill., assignor to Helmco, Inc., Chicago, Ill., a corporation of Illinois Application July 30, 1947, Serial No. 764,737

8 Claims. (Cl. 220—17)

1

This invention relates to a container support and more particularly to a clamp-type support adapted to be removably positioned in clamping relation on a standard food container for convenience in storing the container or in dispensing of the food therefrom.

Heretofore, in preparing foods such as canned vegetables or syrup for serving in a restaurant or the like, the usual procedure has been to open the container and transfer the contents to a serving bowl. If heating is necessary, the contents are transferred to a heating utensil and once more re-transferred to the bowl for serving.

This procedure not only requires expenditure of time by the operator, but also subjects the food to the possibility of contamination due to the repeated transferring.

It is also recognized that heating food in the ordinary type of open-top cooking pan over a gas flame or the like may cause excessive evaporation of the natural moisture in the food. This evaporation makes it necessary to add a liquid, such as water or milk, to the food to bring it back to its original flavor and consistency.

It is thus an object of this invention to provide a support for a food container which may be removably attached to a commercial container, thus providing means for lifting the container and for suspending it in a serving receptacle out of which the food may be served and which container may be closed when the food is not being served.

Another object of this invention is to provide a clamp which may be quickly and easily positioned in place on a standard food container.

A further object of this invention is to provide a clamp having means for lifting the clamp and the article around which the clamp is disposed, and also means for supporting the clamp in a heating and serving receptacle so that such article is suspended in convenient position for serving therefrom and for convenience in heating the contents of the article.

Another object of this invention is to provide a serving receptacle in which the unused portion of the contents of the container may be kept in a sanitary manner.

Another and further object of this invention is to provide a clamp which is simple in design and economical to manufacture.

According to the features of this invention, there is provided a unitary hinged clamp structure movable from a closed circular position under the circular ledge of the container to an open, substantially oval, position which permits the container to pass freely therethrough.

2

Another feature of this invention resides in the provision of a clamp consisting of two substantially semicircular members arranged to be snapped together in position under the ledge of a commercial container.

Another and further feature of this invention resides in the provision of a band type clamp arranged to be positioned under the rim of a commercial container and having one set of outwardly extending projections for lifting said container and another set of projections for setting the container in a serving receptacle.

A further feature of this invention is the provision of a serving receptacle equipped with a heating unit and having a ledge arranged to receive projecting arms of the aforementioned clamp for suspending a commercial container in the heating medium.

Other and further features, objects and advantages of the subject invention will be apparent to one skilled in the art from the following description taken in connection with the annexed drawings.

On the drawings:

Figure 1 is a side elevational view of the clamp assembly of this invention showing, in dotted lines, a pivoted open position of the clamp;

Figure 2 is a vertical sectional view illustrating the serving receptacle of this invention and a standard container suspended therein by the clamp unit of this invention;

Figure 3 is a side elevational view of the serving receptacle of the invention;

Figure 4 is a plan view, partly broken away, of the serving receptacle of this invention with the cover removed showing a container suspended therein by the clamp unit of this invention;

Figure 5 is a fragmentary vertical sectional view of a portion of the clamp shown in Figure 1;

Figure 6 is a fragmentary plan view of the pivoting portion of the clamp of Figure 4;

Figure 7 is a plan view of a modified form of the clamp unit of this invention;

Figure 8 is a side elevational view of the clamp unit of Figure 7; and

Figure 9 is a vertical sectional view of a modified form of the serving receptacle of this invention showing a standard container suspended therein by the clamp unit of this invention.

As shown on the drawings:

The support means of the subject invention is essentially a band type clamp, as illustrated in Figures 1, 4 and 5. This clamp 10 comprises two substantially semi-circular straps 11 and 12, which may suitably be made of a light gauge sheet metal. The ends of each strap are offset, as shown in Figures 4 and 6, to provide a recessed pivoting zone 13. Near either end of the strap 11 there is secured, as by spot welding, a pivoting arm 11a which extends downwardly and forwardly. Similar arms 12a depend from the end portion of the strap 12 and are oppositely disposed relative to the arms 11a of the strap 11 so that holes provided in the lower, forward portion of the arms may be aligned to receive pivot pins 15 and 15a, one on either side of the clamp.

As seen in Figures 1 and 4, the straps 11 and 12 are not quite perfect semicircles and do not abut when they are pivoted into the closed position in which the straps are disposed substantially horizontally. It is also to be noted that the pivot pins 15 and 15a are disposed on a projection of a diameter of the circle formed by the closed straps. Thus, the straps 11 and 12, when attached together and pivoted into a closed position, afford a circular band of metal which, as shown in Figures 2 and 5, may be positioned under the upper bead or ledge 16 formed on the upper, outer edge of each commercial food container or can 17.

The clamp 10 may be positioned on the container 17 by pivoting the straps downwardly as illustrated in dotted lines in Figure 1. Due to the fact that the pivoting axis of the strap is spaced downwardly from the straps, the clamp will assume a substantially oval shape. This oval shape will provide clearance for the container at the marginal portion of the clamp removed from the pivot point, while the recessed pivot zones 13 will be further expanded to permit easy passage of the container at these points. Of course, the depth and width of the recess may be varied to provide a greater or smaller clearance at pivot zones 13 and the location of the pivoting axis may be chosen to attain longer or shorter ovals.

As illustrated in Figures 1 and 6, the upper corner 12b on the strap 12 is bent to overlie the arms 12a and present a confronting surface to the outer edge of the strap 11. At the opposite side of the clamp, the upper end portion 11b of the strap 11, which is the inner strap member on that side, is bent outwardly to face the end of the strap 12.

As a means of lifting the clamp 10, there is secured, as by spot welding to the straps 11 and 12, a pair of lifting hooks 19 and 20 respectively, which are substantially diametrically disposed on a diameter substantially perpendicular to the pivoting axis of the clamp.

A plurality of support members 22 are suitably secured at equally spaced points on the outer surface of the clamp 10 for supporting the clamp 10 in the container, as will be described hereinafter.

In Figure 2 is shown the serving unit 25 of this invention. This unit comprises an outer cylindrical wall 26 suitably made of sheet metal such as stainless steel and an inner wall and base member 27, which has an upper folded-over cylindrical portion 27a arranged to receive the upper rim of the outer wall 26. Near the upper end of the inner wall there is provided an annular ledge 27b which is arranged to receive in supporting relation the support members 22 of the clamp 10.

In the base portion of the inner wall and base member 27 there is provided a recess 27c in which is secured a heater unit 31 which is preferably an electric heater unit receiving energy through a suitable cord 32. The unit 31, which may include the necessary heating elements, thermo-stat and condenser, has a ledge 33 extending therearound by which the element may be held in place through a series of rivets 34 fastened to the base portion of the inner wall member 27.

As a means of closing the open bottom of the serving receptacle 25 to retain insulation, not shown, between the side walls of the receptacle and under the member 27, and as a means for urging the upper edge of the outer wall member 26 into the folded over portion 27a of the inner member 27, there is provided a disk-like closure plate 35 arranged to fit inside the lower portion of the cylindrical outer wall 26 and having a downwardly extending cylindrical flange portion 36 which fits tightly inside the cylindrical outer wall 26. An annular angle member 37 is secured, as by welding, to the inner surface of the outer wall 26. The closure plate 35 may be secured to the housing of the heater 31 by set screws 39. As the plate 35 is drawn upwardly against the housing of the heater 31 by the screws 39, the plate 35 will contact, at its peripheral portion, the angle member 37 and force the outer wall 26 upwardly into the folded over portion 27a of the inner member 27. Thus, a tight joint is made between the outer and inner walls.

In Figure 2 a commercial container 17 is illustrated suspended in a serving receptacle 25 by means of a clamp unit 10 positioned under the upper bead or lip 16 of the container 17.

Water may be suitably employed as a heating medium. Enough water should be placed in the heating zone, defined by the inside of the inner wall and base member 27, so that when the container 17 is suspended therein the lower portion of the container will be submerged in the water to a depth of approximately one inch.

An annular rim member 40, Figures 2 and 4, is arranged to span the opening between the lip 16 of the container 17 and an upper ledge 27c of the inner wall 27, having its outer marginal portion resting on the ledge 27c and the inner marginal portion resting on the lip 16. This annular rim member 40 serves to conceal the clamp unit 10 when the container 17 is suspended in the serving receptacle.

The annular rim member 40 has a series of spaced notches 41 on its outer periphery which may be aligned with a series of similarly spaced projections 42 on the inner surface of the upper portion of the wall member 27. When the markers 41 are aligned with the projectors 42, the annular rim member 40 is permitted to pass downwardly so that its outer marginal portion rests on the ledge 27c. A slight rotation of the rim 40 will cause the extreme outer marginal portion of the rim to slide under the projection 42 and thus become locked thereunder against upward movement.

A cover member 45 having a gripping knob 46 is adapted to fit on the receptacle inside the folded over portion 27a.

It is obvious that when the container 17 is suspended in a serving unit 25 with the cover 45 in place and the heater unit 31 in operation, the container and its contents will be heated in an atmosphere saturated with wet steam. This type of heating prevents the evaporation of moisture from the contents of the can and eliminates the necessity of adding water, milk or the like to the contents to bring it back to its original flavor and consistency.

It is also evident that a very close control of the heating of the contents of the container may be had by heating in a bath of hot water, since hot water lends itself readily to automatic thermostatic control, thus scorching of the products by overheating is eliminated.

In Figures 7 and 8 is illustrated a modified form of the clamp of this invention. This clamp 50 comprises two substantially semicircular straps of metal 51 and 52. Each strap has a pair of projections or dimples 53 aligned laterally of the strap and extending outwardly at one end. These dimples are arranged to snap into holes 54 in an offset end portion 55 of the other strap. Thus, each strap has a pair of dimples 53 at one end and an offset portion 55 with a pair of vertically aligned holes 54 at the other. The bands are assembled into a clamp by bringing them together from opposite sides of the container under the lip thereof. The straps are preferably made of metal and therefore the dimples on the end of each strap will snap into place into corresponding holes in the end of the other strap.

As many dimple and hole combinations may be provided as desired and they may be positioned in vertical alignment or horizontal alignment or any variation thereof to lend rigidity to the assembled clamp. As shown in Figures 6 and 7, the dimples are disposed on a projection of a true diameter of the circle formed by the clamp 50.

As a means of lifting the clamp there is secured as by spot-welding to each band a lifting hook 56. The hooks are diametrically disposed on the clamp on a projection of a diameter substantially perpendicular to a line drawn between the dimples 53 at opposite sides of the clamp.

A plurality of support members 57 are suitably secured at equally spaced points on the outer surface of the clamp 50 for supporting the container on the ledge 27c of the serving receptacle 25.

In Figure 9 is shown a modified form of the serving receptacle of this invention. This receptacle has an upper annular member 61 having folded portions 61a arranged to fit over the upper end of a substantially cylindrical outer wall member 62. This unit may be employed as a serving receptacle for food which does not require heating. The container may be suspended by means of a clamp unit of this invention on a ledge 61b of the upper annular member 61. An annular rim member 64 similar to the rim member 40 of Figure 2 is locked in place on the ledge 61c of the member 61. A cover member 65, having a knob 66, is also provided to close the container.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A container support for a cylindrical container having an upper bead and adapted for supporting the container from a ledge or the like comprising two substantially semicircular straps arranged to be positioned generally horizontally under the upper bead of the cylindrical container, a plurality of arm members projecting outwardly from each strap for engagement over the ledge for supporting said container, and a pair of lifting hooks, one secured to each of said straps, for lifting the container.

2. A container support for a cylindrical container having an upper bead comprising two substantially semicircular straps arranged to be positioned generally horizontally under the upper bead of the cylindrical container for supporting the container therefrom and having opposed offset portions, pivoting members secured to said straps at the offset portions and extending downwardly and forwardly therefrom, the lower end of each pivoting member on each strap being pivotally associated with the lower end of a pivoting member on the other strap, the pivot points being so located as to cause said assembled straps to assume a circular outline in the closed position and an oval outline in the open position, with the offset portions providing clearance for removal of the support when in the open position.

3. A container support comprising two identical substantially semi-circular straps each strap having radially projecting embossed portion at one end and a recess at the other end, said straps being movable into snap-on holding relation with respective embosses and recesses interlocking to define a circular support member.

4. A clamp for supporting a container on a ledge or the like of a serving receptacle comprising two substantially semicircular straps movable under the upper bead of a commercial container to define a circular support member thereunder, each strap having portions movable into snap-on holding relation with portions of the other strap to define a circular support member, a plurality of arm members secured to said strap for supporting the container in the serving receptacle, and a pair of lifting hooks disposed on said clamp.

5. A container support comprising a plurality of identical arcuate straps, each strap having an outwardly dimpled portion at one end and an apertured portion at the other end, the dimple of each strap being movable into the aperture of the next strap to define a substantially circular clamp.

6. A clamp for supporting a container and a receptacle in concentric nested relationship, said receptacle having an inner annular ledge defining an opening and said container being cylindrical and of lesser diameter than said opening and having an upper bead, said clamp comprising two substantially semicircular straps movable into generally horizontal cooperating relation under the upper bead of the container, members secured near the ends of each strap and extending downwardly and toward the members of the other strap to overlie the same, means pivotally connecting the overlying portions of said members, and a plurality of arms extending radially outwardly from each of said straps for engagement over the receptacle ledge for supporting the container therein.

7. A container support for concentrically supporting a cylindrical container having an upper beaded edge within an outer vessel having an inwardly extending annular ledge, said support comprising a pair of substantially semicircular straps, means connecting said straps at their adjacent ends so that the straps may assume a circular shape in conforming engagement with said container beneath said upper beaded edge, a plurality of support members projecting outwardly from each of said straps for resting on said annular ledge, and lifting members extending outwardly from said straps at opposed points intermediate the ends of said straps.

8. A container support comprising two identical substantially semi-circular straps each strap having radially projecting embossed portions at one end and recesses at the other end, said straps being movable into snap-on holding relation with respective embosses and recesses interlocking to define a circular support member, and means secured to each of said straps for supporting them relative to a fixed support.

FREDERICK F. GUNTHER.

References Cited in the file of this patent

UNITED STATES PATENTS

| Number | Name | Date |
|---|---|---|
| 744,813 | Stewart | Nov. 24, 1903 |
| 814,460 | Kruchewitt | Mar. 6, 1906 |
| 862,749 | McLaughlin | Aug. 6, 1907 |
| 874,681 | Hungate | Dec. 24, 1907 |
| 928,841 | Benson | July 20, 1909 |
| 1,081,895 | Duda | Dec. 16, 1913 |
| 1,803,755 | Goez | May 5, 1931 |
| 1,903,910 | Janson | Apr. 18, 1933 |
| 2,118,116 | Schweitzer | May 24, 1938 |
| 2,297,843 | Sharpnack | Oct. 6, 1942 |